United States Patent [19]
Koenig

[11] Patent Number: 5,269,472
[45] Date of Patent: Dec. 14, 1993

[54] WASTE PROCESSING SYSTEM

[76] Inventor: Larry E. Koenig, c/o Komar Industries, Inc., 4425 Marketing Pl., Groveport, Ohio 43125

[21] Appl. No.: 888,532

[22] Filed: May 26, 1992

Related U.S. Application Data

[63] Continuation-in-part of Ser. No. 831,175, Feb. 5, 1992.

[51] Int. Cl.$^5$ ............................................. B02C 19/00
[52] U.S. Cl. .................................... 241/33; 110/232; 241/DIG. 14; 241/DIG. 38
[58] Field of Search ........ 241/33, 31, 285.1, DIG. 14, 241/DIG. 38; 110/222, 223, 347

[56] References Cited

U.S. PATENT DOCUMENTS

| | | | |
|---|---|---|---|
| 4,679,738 | 7/1987 | Prisco et al. | 241/101.2 |
| 4,735,368 | 4/1988 | Jamho et al. | 241/DIG. 38 |
| 5,022,328 | 6/1991 | Robertson | 241/DIG. 14 |

*Primary Examiner*—Douglas D. Watts
*Attorney, Agent, or Firm*—Thompson, Hine and Flory

[57] ABSTRACT

A waste processing system in which containerized waste is received substantially at ground level and is conveyed to an elevator which carries the containerized waste to an upper level discharger which transports the containerized waste, dumps the containers down a drop chute and returns the empty containers to ground level. The dumped waste is shredded and is either injected into an incinerator or is discharged downwardly. The entire system is enclosed and can be maintained at either a negative or positive pressure for receiving radioactive or hazardous wastes, or at a reduced oxygen environment for receiving flammable hazardous waste. Containerized waste is received through air locks which include sliding doors that are supported entirely about the peripheries when sealed for purposes of explosion resistance. The injector discharge tube includes a slide box in which a pair of conduit segments are mounted and can be positioned such that one or the other of the segments is connected to the output conduit. One segment connects the output conduit to an incinerator or other receiver and the other segment includes an open bottom so that material may drop vertically into a receptacle.

25 Claims, 23 Drawing Sheets

WASTE PROCESSING SYSTEM

RELATED APPLICATION INFORMATION

This application is a continuation in part of U.S. application Ser. No. 07/831,175 filed Feb. 5, 1992.

BACKGROUND OF THE INVENTION

The present invention relates to waste processing systems and, more particularly, to waste processing systems for handling hazardous or radioactive waste which must be totally enclosed to maintain a specified environment and in which material is dumped and shredded before being conveyed for further treatment or incineration.

Environmental laws require that hazardous material, including radioactive material, either be incinerated, stabilized or processed under certain prescribed conditions, or collected, packaged and stored at special sites. In any case, it is desirable to reduce the particle size of the material as much as possible. In the case of material to be incinerated, small particle size insures more complete combustion and facilitates feeding into an incinerator. In the case of material to be packaged, reduction of particle size allows a greater amount of material to be shipped within a given container. In the case of materials to be stabilized, small particle size insures more complete stabilization. In the case of material to be processed in a slagging mode incinerator, small particle size insures more complete breakdown of materials.

Since the handling of such material may give rise to toxic or radioactive fumes, or create the hazard of an explosion, it is desirable to process such material in enclosed environments. For example, in Robertson U.S. Pat. No. 5,022,328, there is disclosed a system in which containerized waste is conveyed upwardly through an elevator, then horizontally to an air lock where the containerized waste is dumped through a drop chute into a shredder device which grinds the waste material and containers, then is injected by a feed screw into an incinerator. A disadvantage with this system is that the material is elevated and conveyed horizontally in a system which is not enclosed or protected from the environment. Further, the system disclosed in the Robertson patent is not capable of receiving and dumping hazardous or radioactive material from reusable containers. Accordingly, there is a need for a waste processing system in which material can be received at ground level or intermediate levels, then processed for storage, stabilization, incineration or additional processing in a totally enclosed environment at a different level. Further, such a system should be able to handle reusable containers.

SUMMARY OF THE INVENTION

The present invention is a waste processing system adapted to handle hazardous and radioactive containerized material in which the material is received substantially at ground level or intermediate levels, is elevated, dumped, the material is shredded, blended, mixed, homogenized or combined with stabilizing agents, and is injected into an incinerator or a container or into an additional processing stage. The entire system is enclosed and maintained in a low oxygen or inert gas environment. Gas pressure within the system can be maintained positive (greater than atmospheric) or negative (less than atmospheric) as the application requires. As a result, the likelihood of contamination reaching the ambient during the elevating, dumping, shredding and injecting processes is substantially reduced, as is the likelihood of explosion.

The system includes one or more powered infeed conveyors, each having its own air lock. Each air lock has inner and outer doors which include a sliding door member that is supported entirely about its periphery when closed and is sealable. These door seal assemblies can be of conventional mechanically-loaded lip or inflatable design. Seals can be located on one side of the door or on both sides, providing redundant protection. Accordingly, the doors are better able to withstand explosions than prior art air lock doors, and yet are of a relatively simple construction.

The air locks are connected to a totally enclosed, substantially vertical elevator having a powered conveyor on the elevator platform for receiving containerized waste from one or more air locks. The elevator platform elevates the containerized waste to a dual purpose discharger. The discharger includes primary and auxiliary ram members. If the waste is in disposable containers, the primary ram member transports the containers horizontally from the elevator to be dropped into the shredder. If the waste is in reusable containers, the ram member grips the container, transports the container to a position above the shredder, inverts the container to dump the contents, uprights the container and retracts it to the elevator for return to the air locks empty.

Should the size of the container dictate, the auxiliary ram member operates synchronously with the primary ram member to grip the container from the side opposite the primary ram member. Disposable containers would include such items as 55 gallon drums, Gaylord containers, 300 gallon liquid packs and the like. The ram members are displacable horizontally by motorized ball screws. The clamping component of the ram members includes a clamping frame on which are mounted two or more clamping fingers that are advanced horizontally by a pair of hydraulic cylinder motors and are clamped toward and away from each other by a third hydraulic cylinder motor. The clamping frames are rotated, when a reusable container is dumped, by a linear or rotary actuator powered by a hydraulic cylinder motor.

The drop chute is a contained housing having explosion doors in the ceiling and communicates with a dual auger shredder. The dual auger shredder discharges through material discharge doors into a single auger shredder, which, in turn, discharges sidewardly into a feed screw that pumps the material horizontally into an incinerator, container or additional processor. A rotary gate is mounted downstream of the injector feed screw and can be opened or closed to prevent burn-back and escape of material.

A slide box is mounted downstream of the gate and includes a pair of conduit segments. The first conduit segment interconnects the feeder screw with an incinerator mounted on an opposite side of the slide box. The second conduit segment has an open bottom and a deflector plate to deflect material downwardly into a receptacle or other container for transportation.

Accordingly, it is an object of the present invention to provide a waste processing system in which waste material is received at ground level or intermediate levels, is elevated, dumped, shredded, blended and fed to an incinerator, container or additional processor, all in an enclosed environment in which the atmosphere may be maintained in a low oxygen or inert gas environment; a waste processing system in which the inlet air locks include sliding doors which are supported about their entire peripheries when closed and are sealable; a waste processing system in which a discharger transports containerized waste horizontally to a drop chute and can displace disposable containers and a pallet on which they are carried or reusable containers, the latter of which are dumped and returned to ground level; a waste processing system in which the ground and shredded waste material can be pumped directly into an incineration device, or to a container or additional processing machinery for further treatment or shipping; and a waste processing system which is relatively safe to operate and relatively easy to maintain.

Other objects and advantages of the present invention will be apparent from the following description, the accompanying drawings and the appended claims.

DETAILED DESCRIPTION

Figure 1:
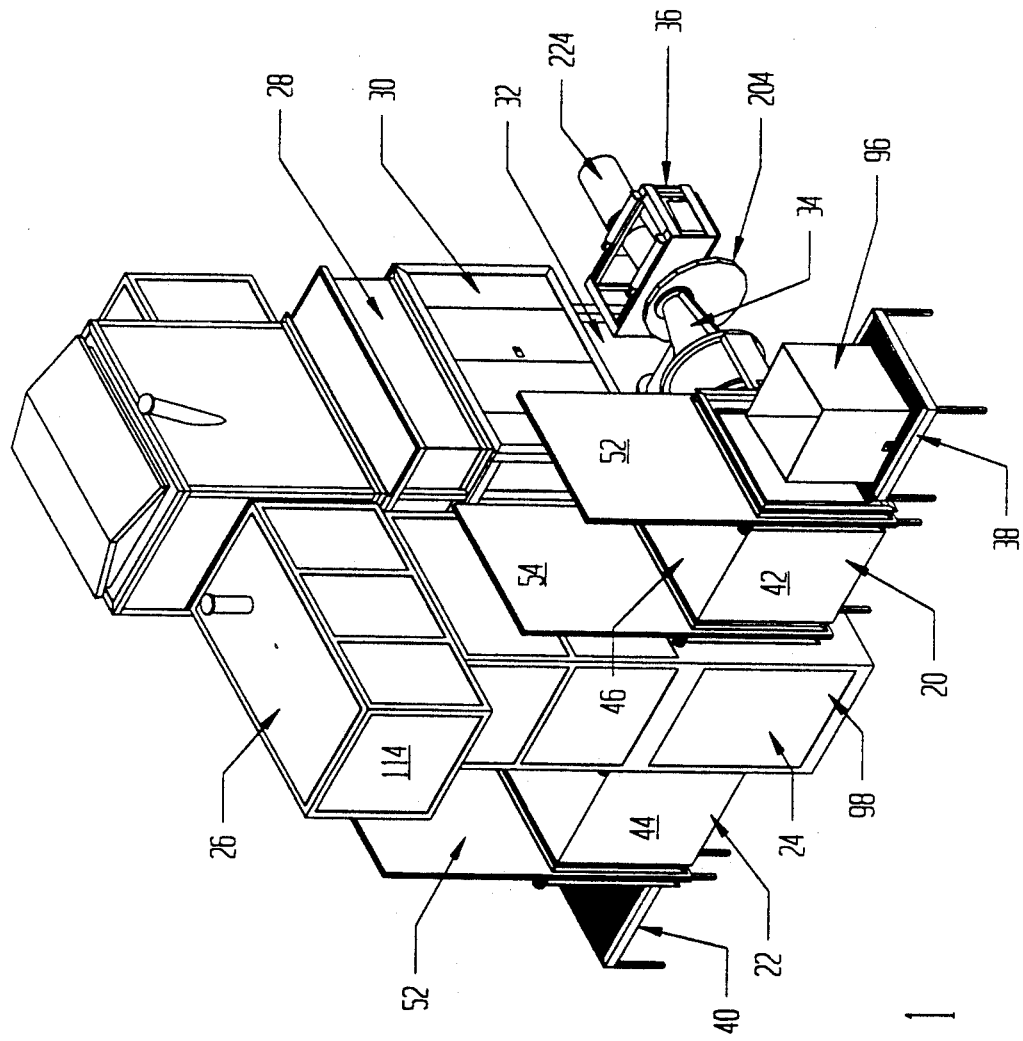
FIG. 1 is a somewhat schematic, perspective view of a waste processing system incorporating the present invention.

As shown in FIG. 1, the waste processing system of the present invention includes an infeed conveyor 20, an outfeed conveyor 22, elevator 24, discharger 26, hopper extension 28, dual auger assembly 30, single auger assembly 32, injector 34, and slide box 36. The aforementioned components all are totally enclosed so that waste material being received on infeed conveyor 20 enters a controlled atmosphere environment for the entire process, until the material either enters an incinerator (see FIG. 14) or is discharged into a storage or transportation container or additional processing equipment (not shown).

The infeed and outfeed conveyors 20, 22 are substantially at ground level so that they may receive containerized hazardous material from forklifts, truck beds, rail cars and the like. However, the invention may include multiple infeed conveyors, arranged at multiple levels, and not depart from the scope of the invention. The infeed and outfeed conveyors 20, 22 include motorized conveyors 38, 40 adjacent to air locks 42, 44. The air locks 42, 44 communicate with the elevator 24.

Figure 2:
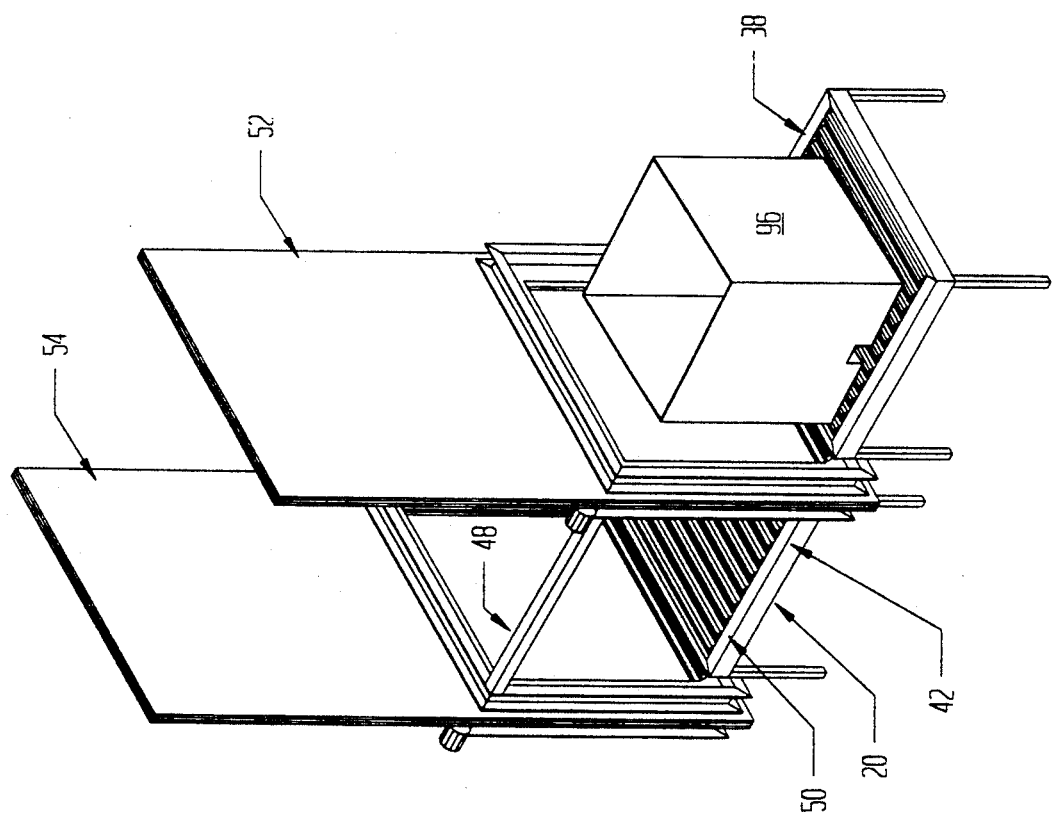
FIG. 2 is a detail of the system of FIG. 1 showing an infeed conveyor and air lock, in which the side panels of the air lock have been removed.

The construction of air locks 42, 44 is substantially identical. Accordingly, the following description will be directed to air lock 42, it being understood that the description applies as well for air lock 44. Air lock 42 is totally enclosed by panels 46 which are attached to a frame 48, preferably by bolts (now shown) as shown in FIG. 2. The frame 48 also encloses a motorized conveyor 50 which extends between inner and outer air lock door assemblies 52, 54.

Figure 3:
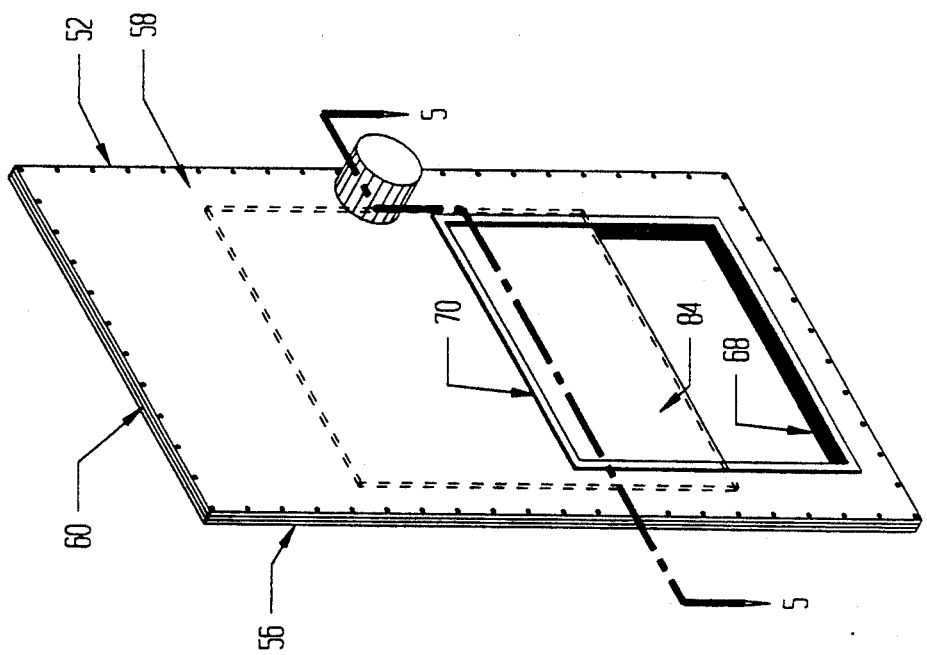
FIG. 3 is a detail of the system of FIG. 1 showing an air lock door.
Figure 4:
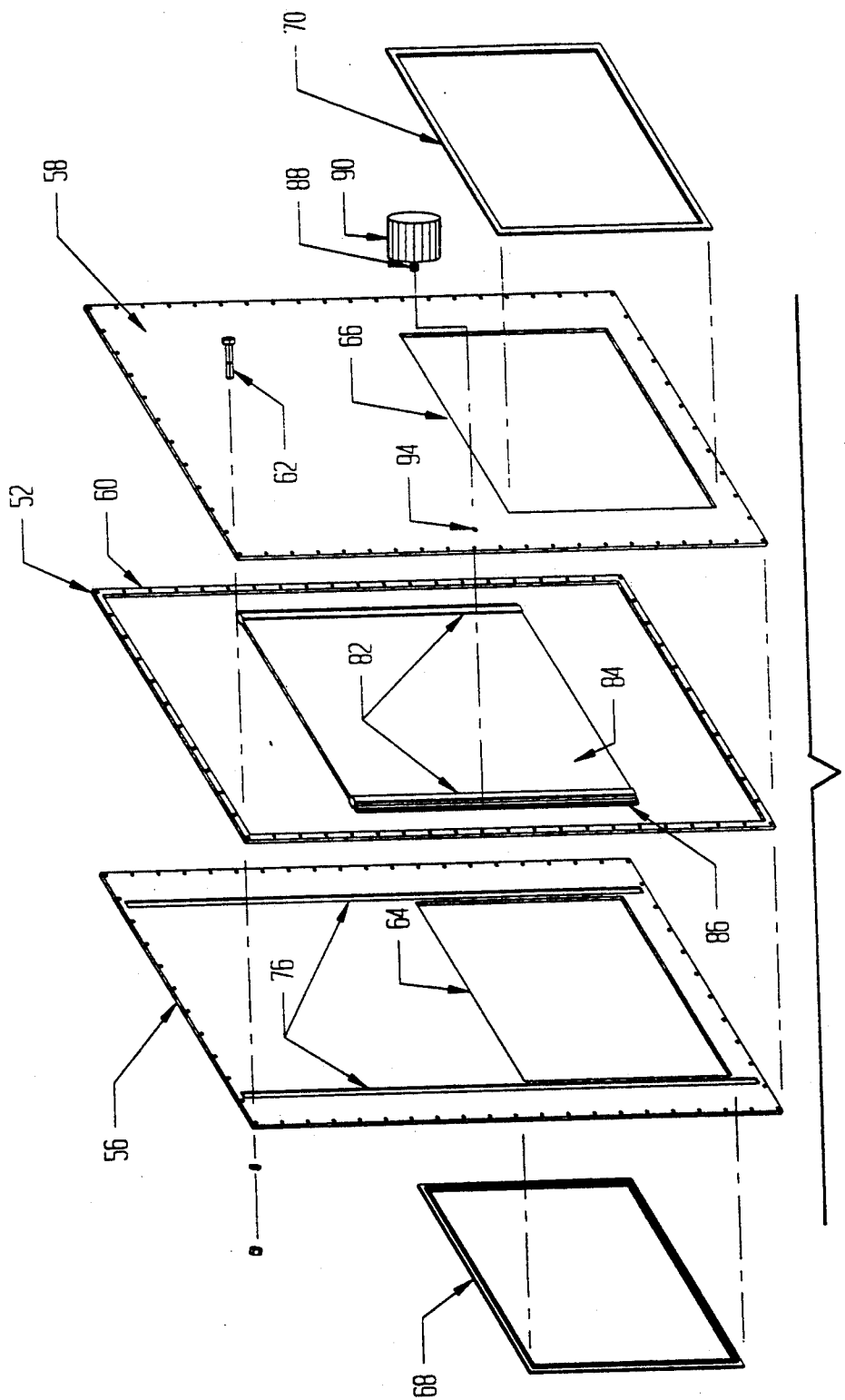
FIG. 4 is an exploded, perspective view of the door assembly of FIG. 3.
Figure 5:
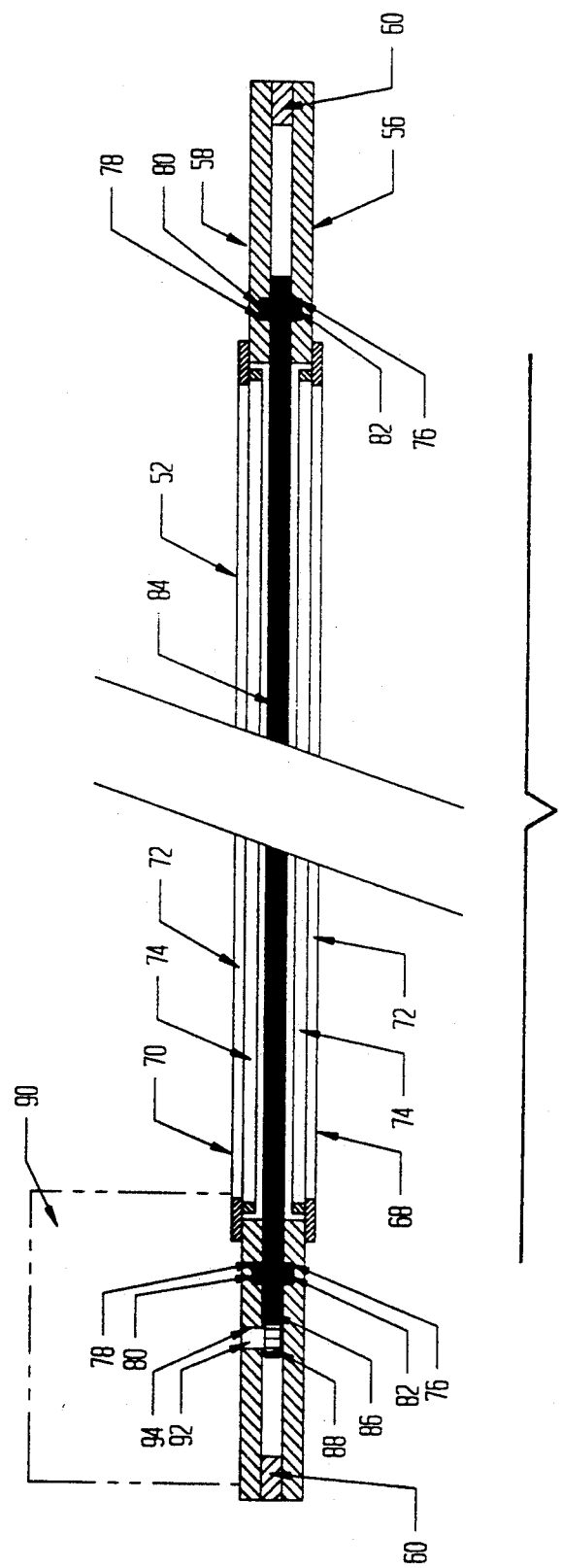
FIG. 5 is a section taken at Line 5—5 of FIG. 3 in which the center section has been broken away.

The following description will be directed to air lock door assembly 52, it being understood that the description applies to the construction of air lock door assembly 54 as well as the air lock door assemblies for air lock 44 of conveyor 22. As shown in FIGS. 3, 4, and 5, the air lock door assembly 52 includes plate-like inner and outer panels 56, 58, separated by a rectangular spacer 60, which includes a seal (not shown), such as an O-ring seal, on each side. However, other types or seals, such as caulking seals, may be used without departing from the scope of the invention. The panels 56, 58 and spacer 60 are sandwiched together and held in position by a ring of nut and bolt assemblies 62 (see FIG. 4). Inner and outer panels 56, 58 include rectangular openings 64, 66 which receive seal assemblies 68, 70, respectively. Seal assemblies 68, 70 preferably are inflatable seals. As best shown in FIG. 5, gasket assemblies 68, 70 each include a retainer frame 72 and preferably a rectangular inflatable seal element 74.

As shown in FIG. 5, panels 56, 58 include pairs of vertical tracks 76, 78 which receive the vertically extending ribs 80, 82 of a door 84. The door 84 includes a longitudinal rack 86 which engages a pinion 88 driven by a hydraulic motor 90. The motor 90 is mounted on panel 58 and the pinion 88 is mounted on a shaft 92 which extends through an opening 94.

As shown in FIG. 1, when a reusable canister 96 is placed upon conveyor 38, the air lock door seals 74 are depressurized (see FIG. 5) and motor 90 actuated to rotate pinion 88. This causes the rack 86 and door 84 to be raised upwardly to open the passageway formed by openings 64, 66 to allow the motorized conveyor 38 to convey the canister 96 onto the conveyor 50 within the air lock 42.

Figure 6:
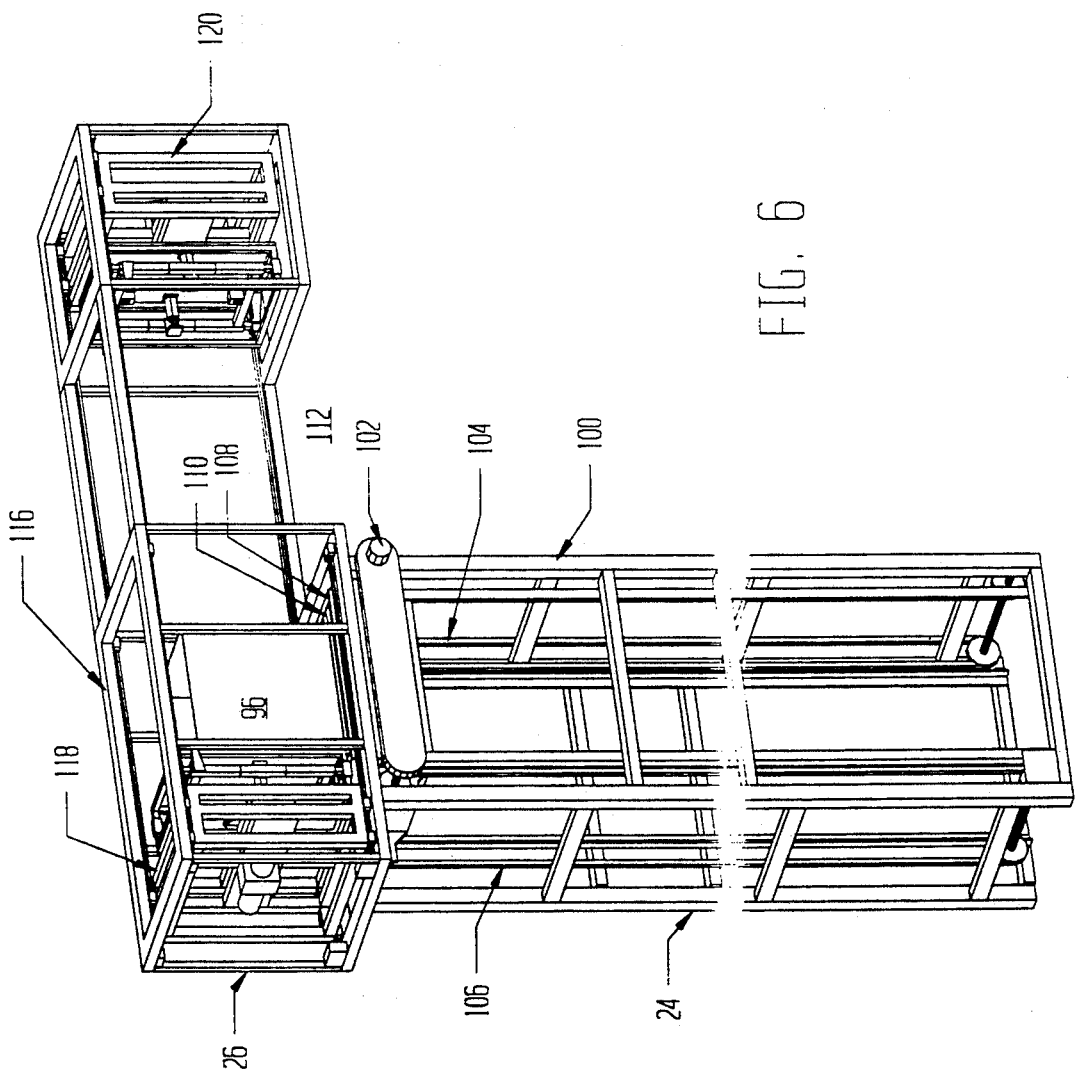
FIG. 6 is a detail showing the elevator and discharger structure in which the side panels have been removed to show the interior of these components.

As shown in FIG. 1, the elevator 24 is totally enclosed by panels 98 which are welded to a framework 100 shown in FIG. 6. The elevator 24 includes a hydraulic drive motor 102 which drives two sets of drive chains 104, 106 that are connected to a elevator platform 108 having driven rollers 110. The motorized rollers 110 are oriented to receive a canister 96 or other types of containerized waste from air lock 42. The discharger 26 is positioned at the top of the elevator 24 and intersects a dump chamber 112 that communicates with the drop chute 28 (see FIG. 1). The discharger 24 is totally enclosed by panels 114 which are welded to a framework 116. The framework 116 encloses ram member 118, positioned adjacent to elevator 24, and ram member 120.

Figure 7:
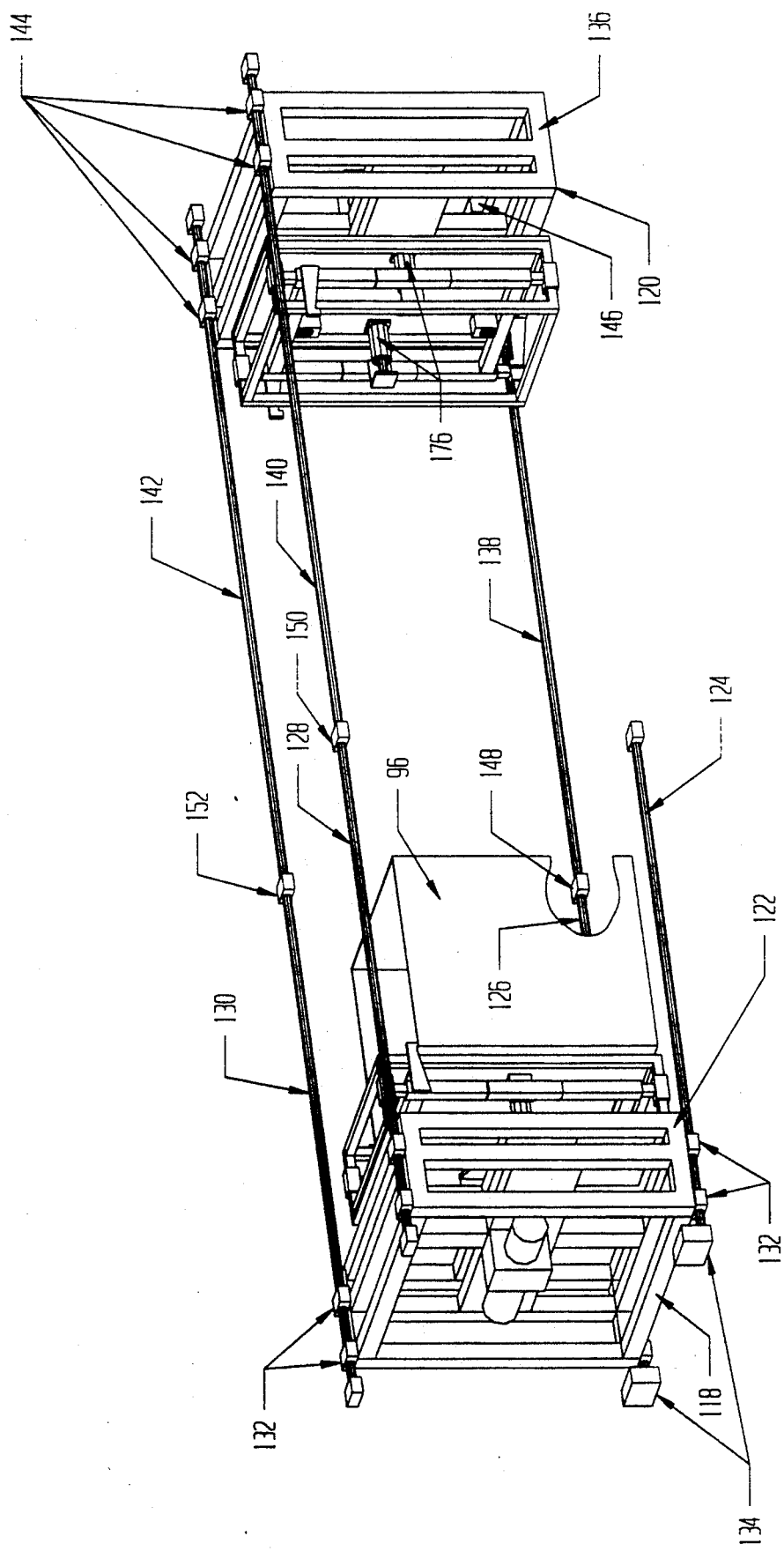
FIG. 7 is a detail of the discharger of FIG. 6 showing the ram members.

As shown in FIG. 7, ram member 118 includes a ram carriage 122 which is supported on four ball screw rods 124, 126, 128, 130 by ball nuts 132. Motors 134 rotate the ball screw rods to displace the carriage 122 along the discharger 26 (see FIG. 6). Similarly, ram member 120 includes a ram carriage 136 which is supported on ball screw rods 138, 140, 142 by ball nuts 144. Ram member 120 is powered by a motor 146 which is connected to turn ball rod 138. Ball rods 138, 140, 142 are attached to joints 148, 150, 152, respectively, so that the rods 138-142 can rotate independently of rods 126-130, and ram member 120 is capable of moving independently of ram member 118.

Figure 8:
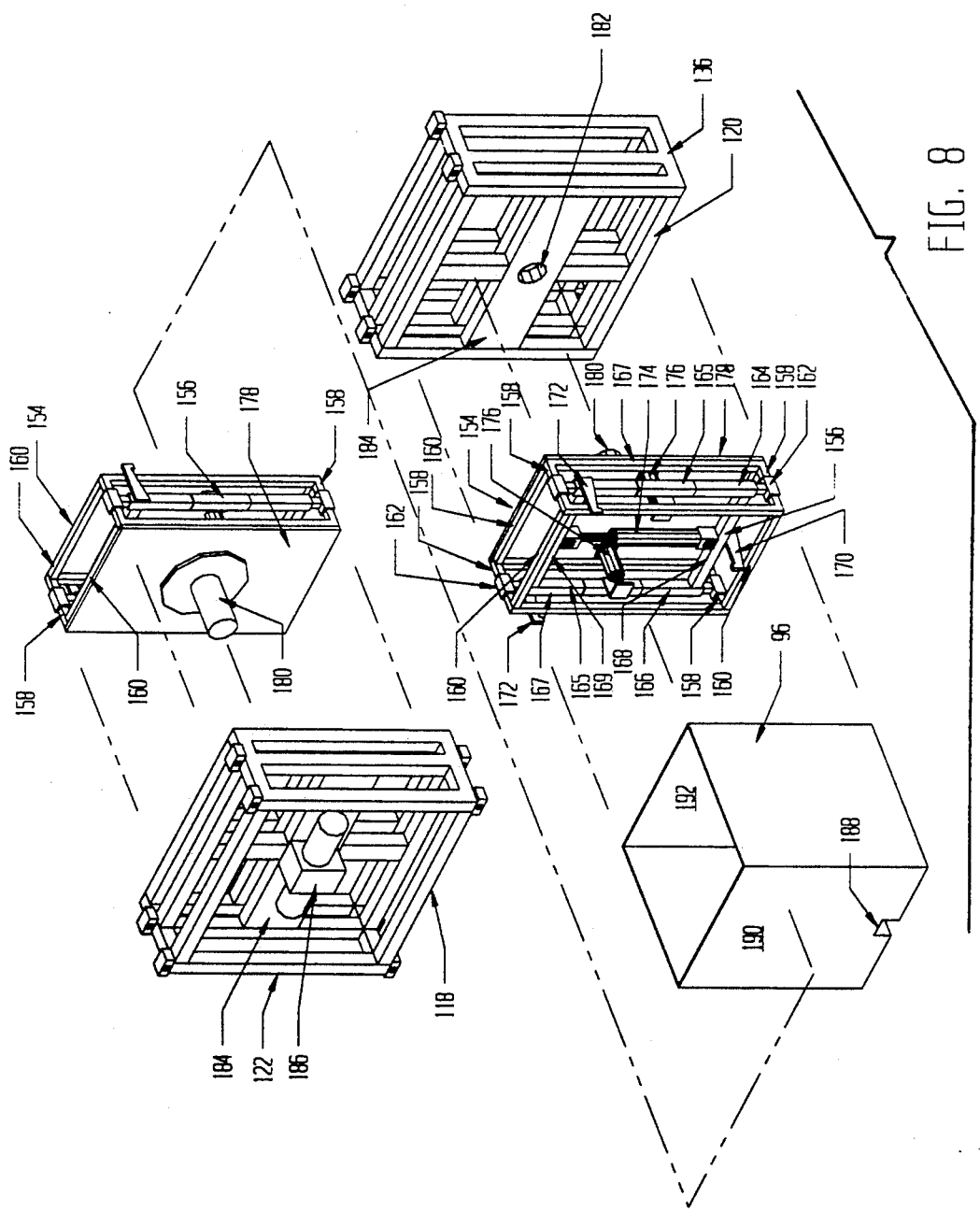
FIG. 8 is an exploded, perspective view of the ram members of FIG. 7 and a canister.

As shown in FIG. 8, ram members 118, 120 include pivoting frames 154 which support gripper frames 156 for engaging canisters 96. The pivoting frames 154 each include longitudinal members 158 which are interconnected by transverse members 160. The longitudinal members 158 support slides 162 which are connected to the gripper frame 156, so that the gripper frame is slidable relative to the pivoting frame 154. The gripper frame 156 includes vertical struts 164 which slidably support segmented sleeves 165 having segments 166, 167 which are spanned by transverse struts 168, 169.

A bottom hook 170 is mounted on lower transverse strut 168 and hooks 172 are mounted on the outside of sleeve segments 167. Sleeves 166 are segmented so that transverse struts can be varied in vertical spacing, thereby varying the vertical spacing between hooks 172 and hook 170. Double-acting cylinder motor 174 spans the transverse struts 168, 169 of the pivoting frame and is actuated to move the hooks 172, 170 apart or toward each other to grip the canister 96. Lateral cylinder motors 176 are mounted on the pivoting frame 154 at one end and on the gripper frame 156 at an opposite end. Accordingly, the lateral of the cylinders 176 can be actuated to displace the gripper frame 156 relative to the pivoting frame 154.

A rear panel 178 is mounted on the pivoting frame 154 and supports a pivoting stud 180. Pivoting stud 180 is received within a bore 182 formed within support frame cross members 184. On ram member 118 only, a rotary actuator 186 is mounted which engages stud 180 and rotates pivoting frame 154. Pivoting frame 154 on ram member 120 pivots freely. Canister 96 includes bottom cut-outs 188 on opposing faces 190, 192 (only cut-out on face 190 is shown) which are shaped to receive the lower hooks 170 of the pivoting frames 154.

Figure 9:
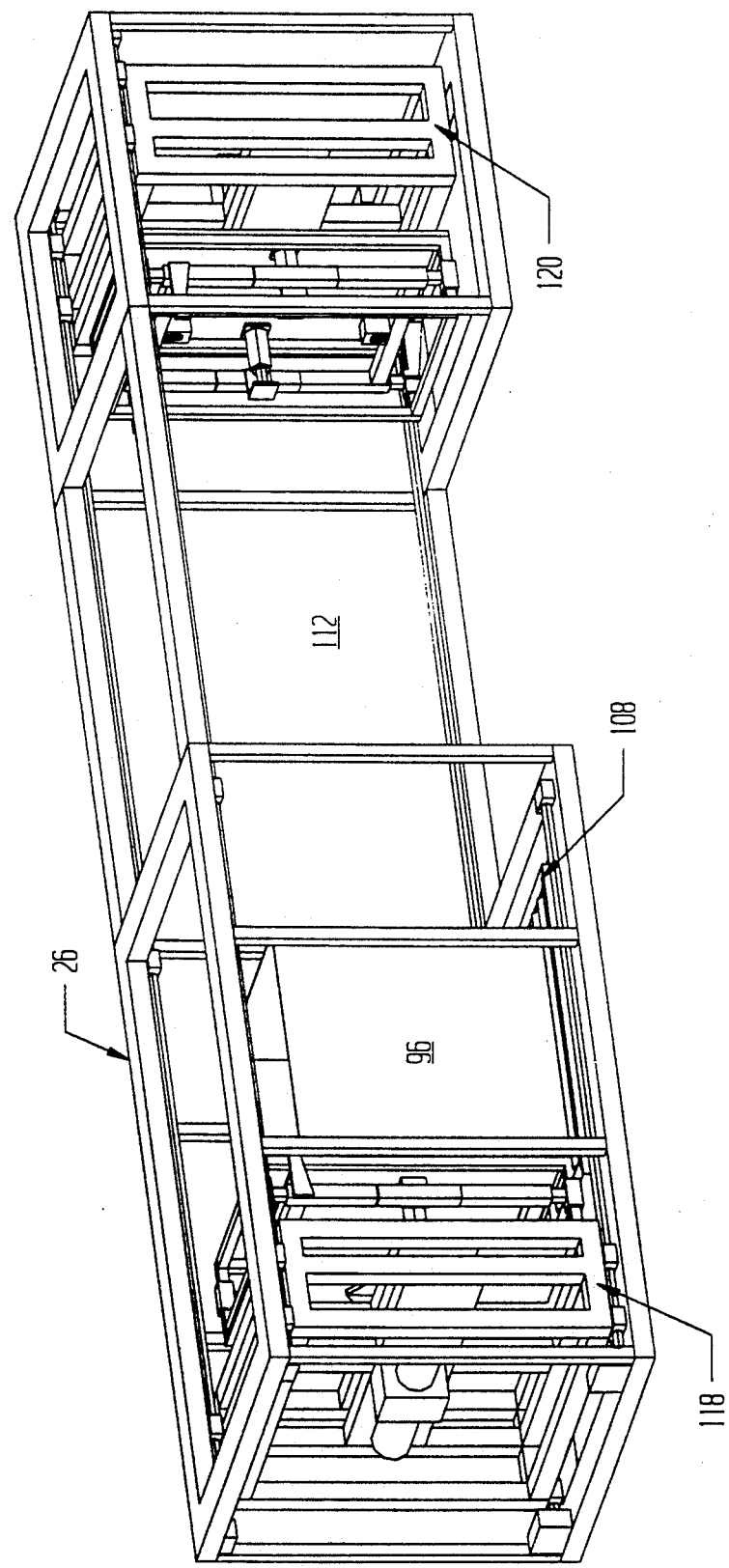
FIG. 9 is a detail showing the discharger of FIG. 6 in which a reusable canister is positioned on the elevator platform.
Figure 10:
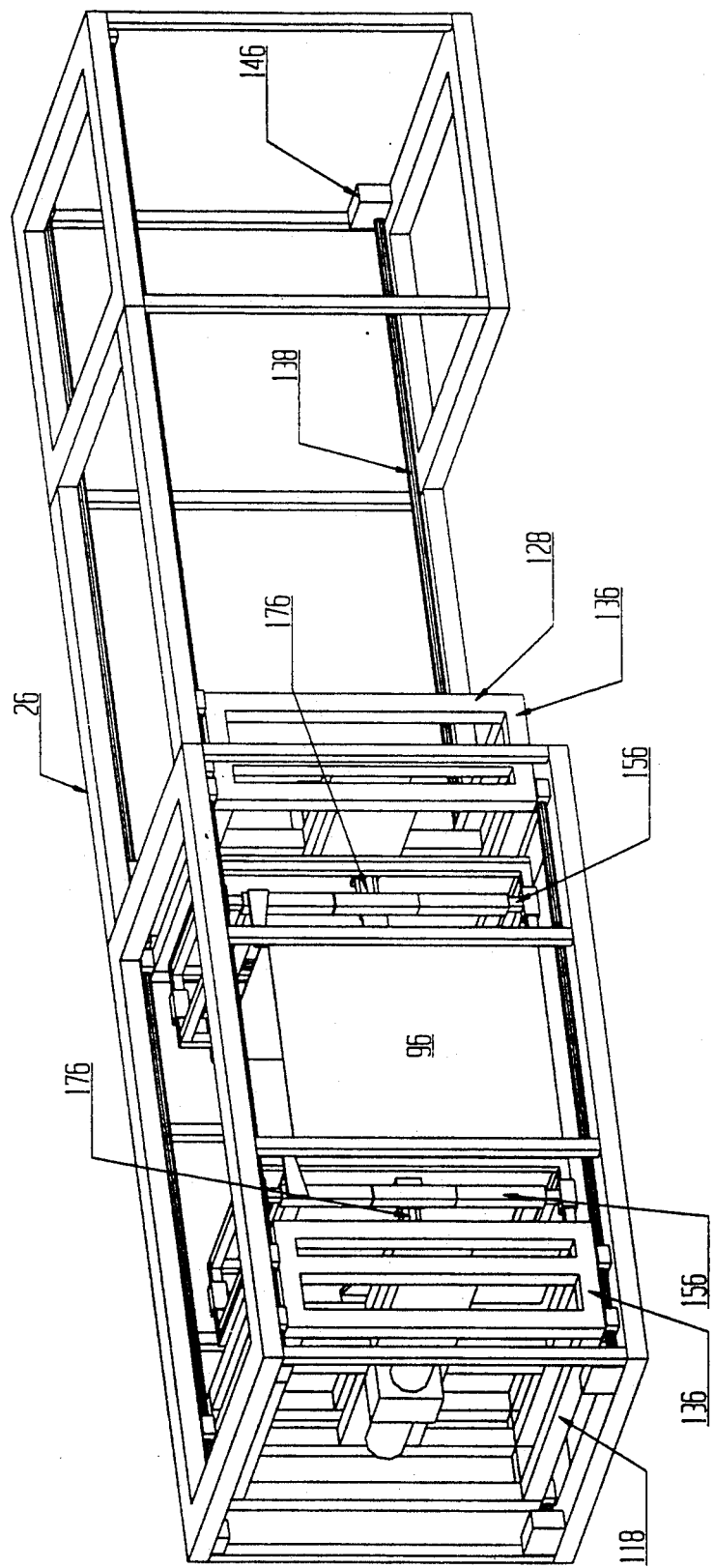
FIG. 10 is the detail of FIG. 9 in which the opposing ram member is engaging the canister.

The action of discharger 26 is shown sequentially in FIGS. 9, 10, 11, and 12. The procedure begins with the elevator platform 108 being raised to the discharger 26. At this time, the ram members 118, 120 are in a retracted position. As shown in FIG. 10, motor 146 is actuated to drive rod 138 to advance ram carriage 136 to the container 96. Cylinders 176 on ram members 120 and ram member 118 are actuated to advance the gripper frames 156 toward the canister 96. When the gripper frames 156 are properly positioned, the cylinders 174 (see FIG. 8) are actuated to clamp the upper and lower hooks 170, 172 together, thereby engaging the canister 96 at both ends.

Figure 11:
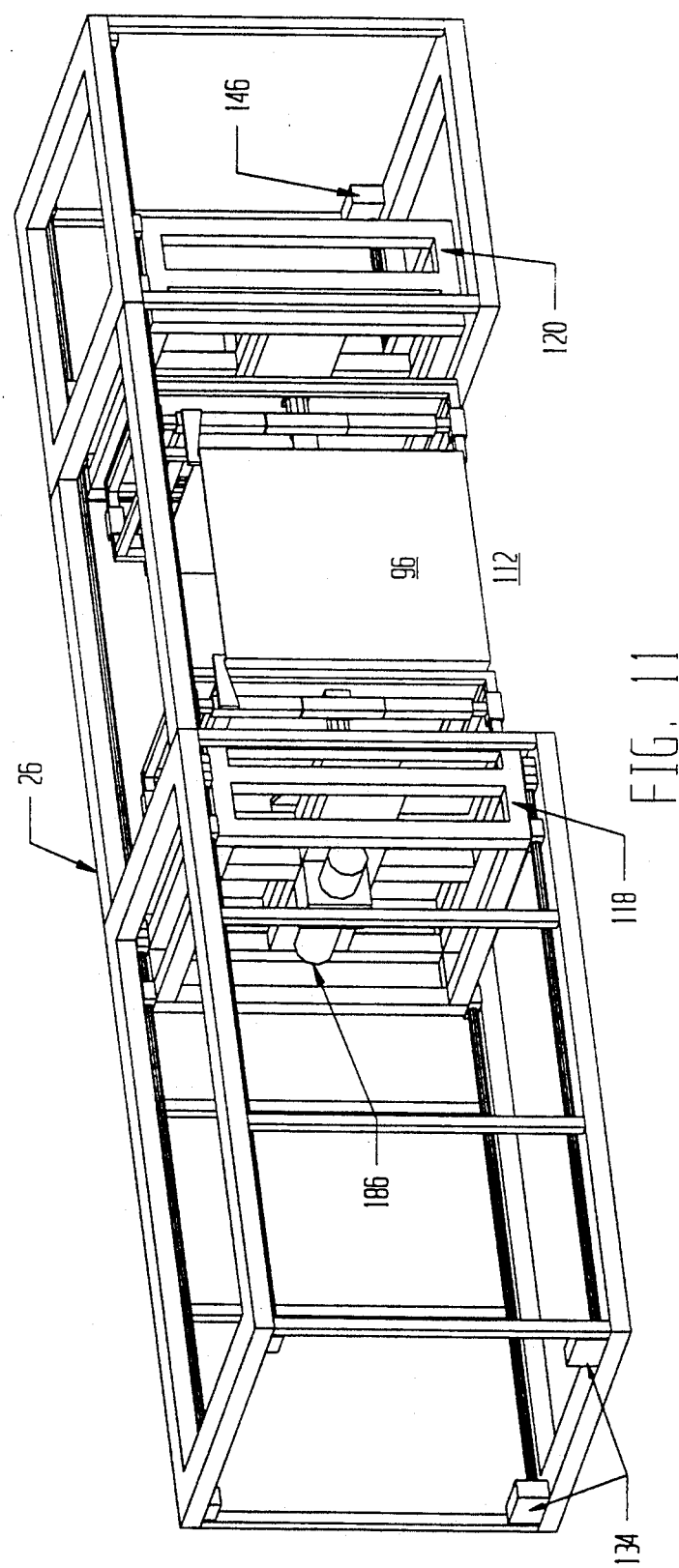
FIG. 11 is the detail of FIG. 9 in which the canister has been transported to the drop chute area.
Figure 12:
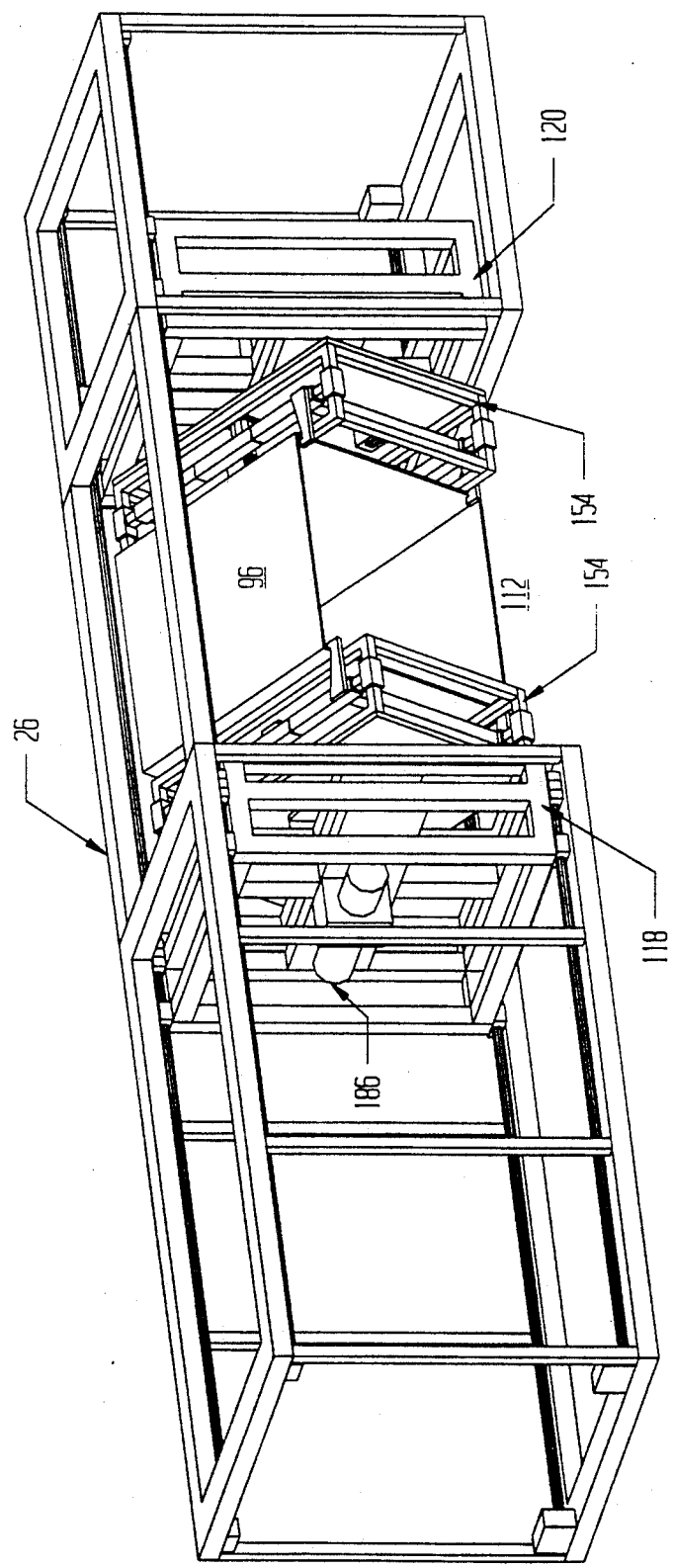
FIG. 12 is the detail of FIG. 11 in which the canister has been inverted to dump its contents.

As shown in FIG. 11, the motors 134 and 146 have been actuated to displace ram member 118 to the drop chamber 112, and similarly, motor 146 has been actuated to retract ram member 120. The canister 96 is now positioned in the drop chamber 112. As shown in FIG. 12, the rotary actuator 186 is activated to rotate pivoting frame 154 to rotate canister 96 to a dump position. Pivoting frame 154 of ram member 120, which pivots freely, is also rotated. The rotary actuator is adjusted to rotate the canister 96 through 180 so that all of the contents are dumped in the drop zone. Once the dumping action has been completed, the rotary actuator 186 rotates the gripper frames 154 to an upright position, as shown in FIG. 11, and the two ram members 118, 120 are displaced sidewardly to the configuration shown in FIG. 10. The cylinders 174 are actuated to disengage the upper and lower hooks 172, 170 from the canister 96, and the cylinders 176 actuated to displace the gripper frames 156 from the canister 96. At this time, the canister 96 is resting upon the elevator platform 108 (see FIG. 9).

The ram member 120 is displaced sidewardly away from the canister 96 to the position shown in FIG. 9, and the elevator 24 (see FIG. 6) actuated to lower the canister 96 to where it is level with air locks 42, 44. The air lock door 54 is opened and the conveyor 110 actuated to displace the empty canister to within the outfeed air lock 44, where it is received by powered rollers 50. The outfeed air lock door 54 closes, the outfeed air lock 42 is purged and door 52 opens to allow the canister 96 to be displaced sidewardly to outlet conveyor 40.

Figure 13:
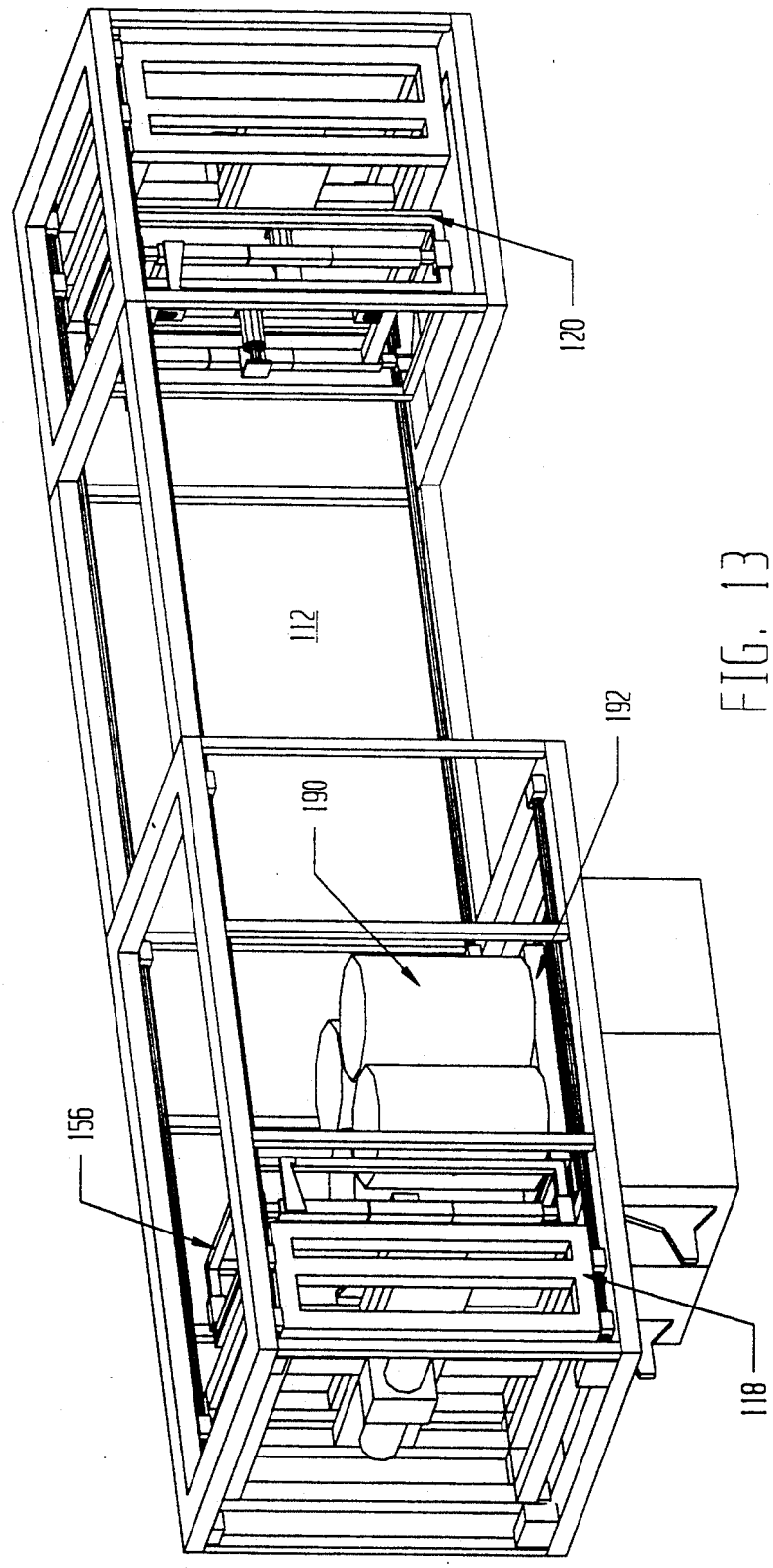
FIG. 13 is a detail of the discharger of the system of FIG. 1 in which disposable containers are supported on the elevator platform.

As shown in FIG. 13, if disposable containers, such as 55 gallon drums 190 supported by a pallet 192 are to be disposed of, ram member 120 is not actuated. Rather, ram member 118 is actuated to displace the pallet 192 and container 190 sidewardly to the drop zone 112. For this type of waste, the gripper frame 156 of the ram member 118 is not displaced forwardly since the hooks are not used to engage the container.

Figure 14:
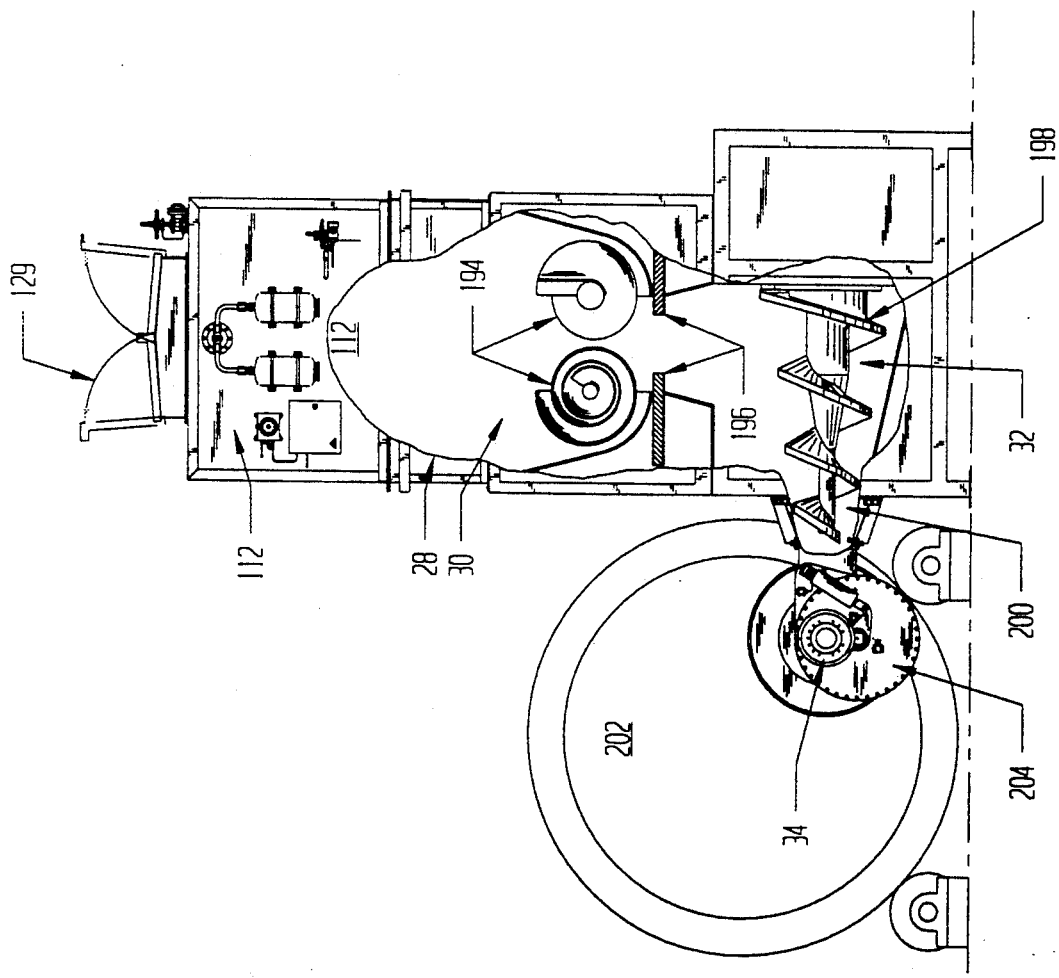
FIG. 14 is a detail of the system of FIG. 1 showing a schematic side elevation of the shredder and injector components.

As shown in FIG. 14, the drop zone 112 is enclosed within a drop chute 28 having explosion doors 129. Drop chute 28 which feeds a dual auger 30 having a pair of opposing, tapered auger screws 194. The dual auger 30 also includes a pair of doors 196 which control the residence time of waste material within the dual auger compartment.

The single auger 32 includes a single auger screw 198 which receives shredder material from the dual auger 30 and further reduces and compresses it, and pumps it through an outlet, extrusion tube 200. The extrusion tube 200 is connected to a an injector auger 34 which pumps the material into a rotary reactor 202. Injector auger 34 also could pump material into a container or additional processing or conveying equipment (not shown), such as a ball mill, without departing from the scope of the invention. As shown in FIGS. 1 and 14, a rotary gate 204 is positioned between the injector 34 and reactor 202, and can be opened and closed to prevent burn-back or escape of material. The dual auger 30 preferably has the construction of the dual auger disclosed in Koenig U.S. Pat. No. 4,938,426. The single auger 32 preferably has the construction shown in Koenig U.S. Pat. No. 4,951,884, and the injector mechanism preferably has the structure shown in Koenig U.S. Pat. No. 4,915,308, the disclosures of these patents being incorporated herein by reference. Further, the rotary door structure is disclosed in Koenig U.S. Pat. No. 632,766, filed Dec. 21, 1990, the disclosure of which is incorporated herein by reference.

Figure 15:
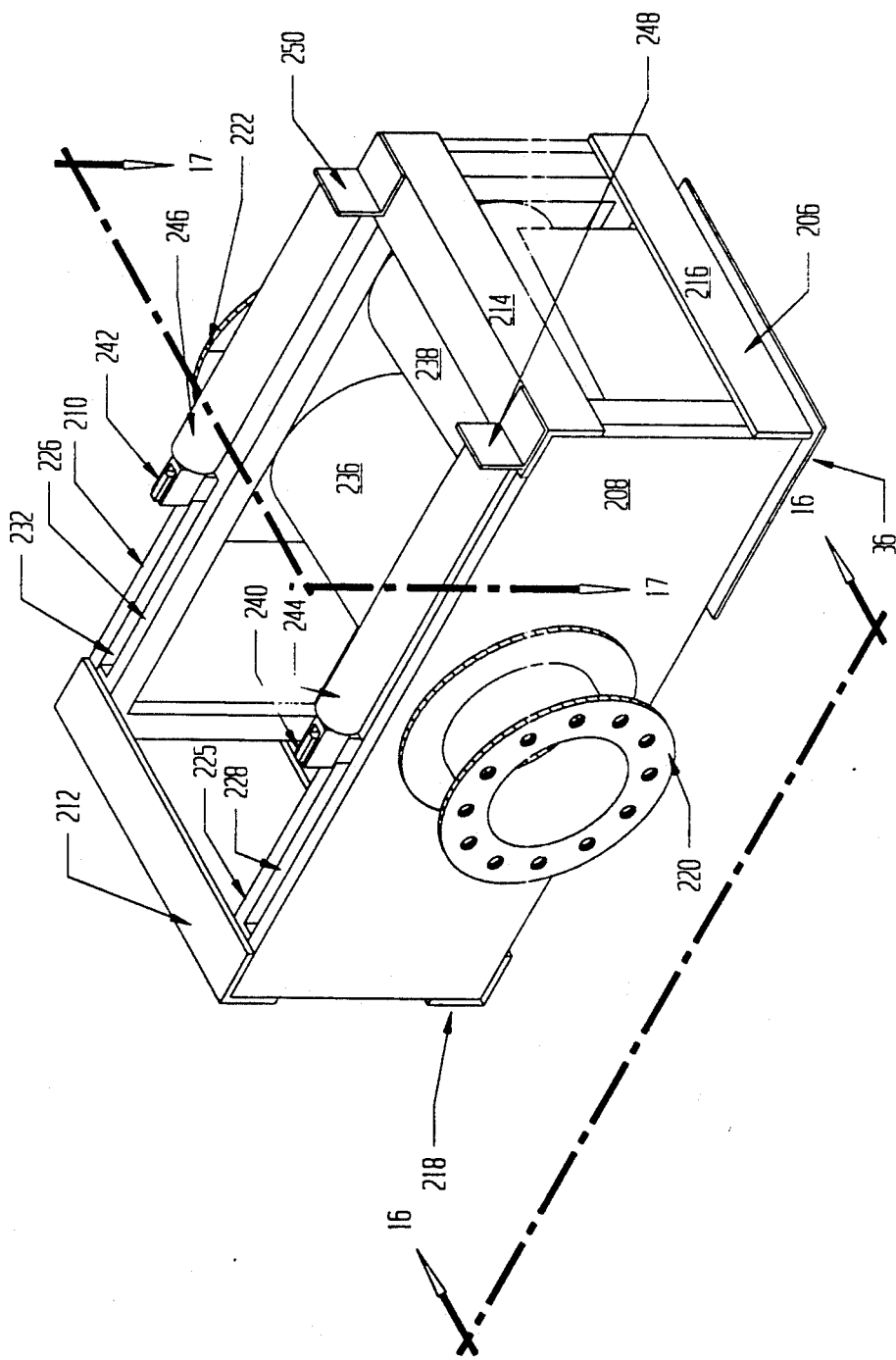
FIG. 15 is a detail showing a perspective view of the slide box of the system of FIG. 1.
Figure 16:
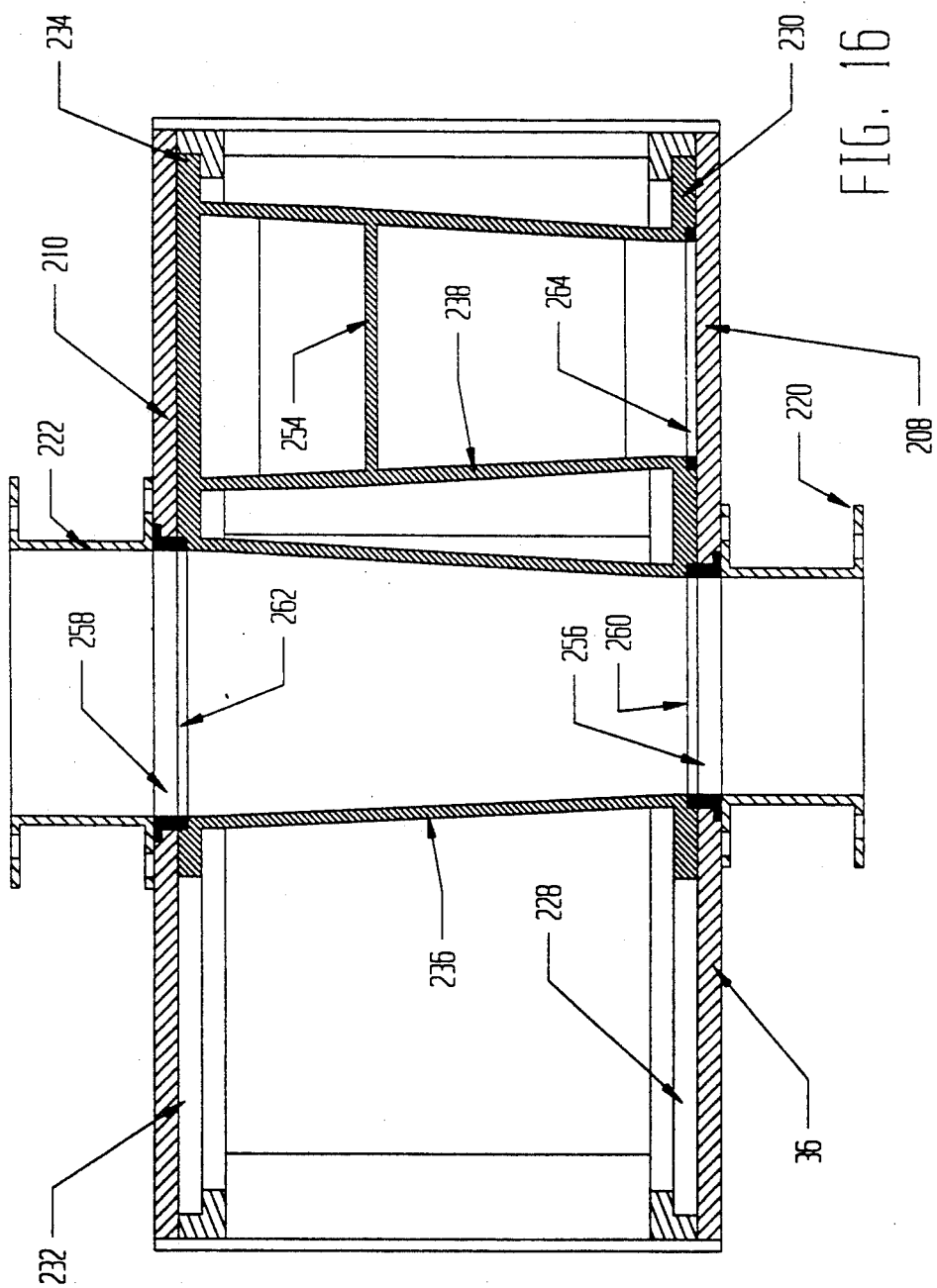
FIG. 16 is a section taken at Line 16—16 of FIG. 15.
Figure 17:
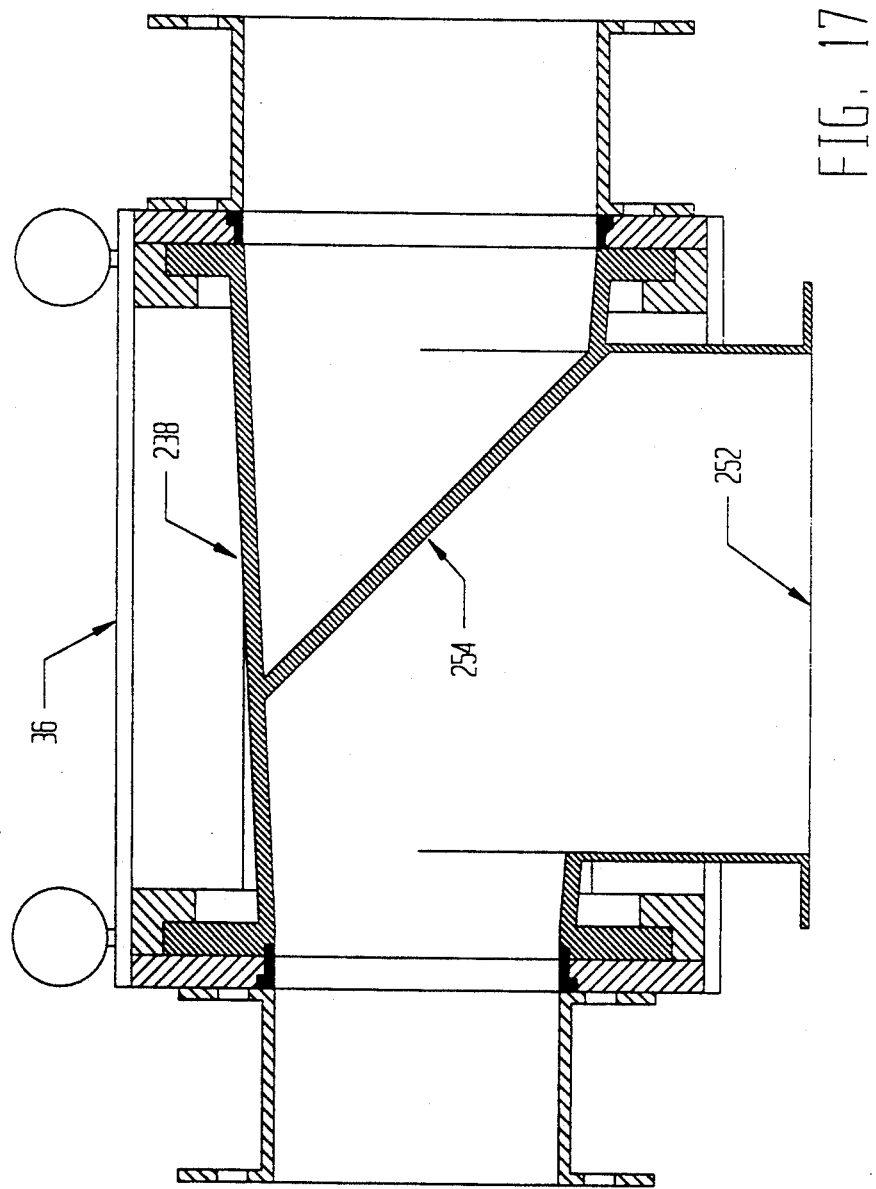
FIG. 17 is a section taken at Line 17—17 of FIG. 15.

As shown in FIGS. 15, 16, and 17, the slide box 36 includes a housing 206 having a front wall 208, a rear wall 210 and transverse support members 212, 214, 216, 218. A flange 220 is mounted on front wall 208 and is connected to the injector auger 34 (see FIGS. 1 and 14). Rear wall 210 includes outlet flange 222 which is connected to a feed conduit 224 (see FIG. 1) that is connected to the reactor 202.

A forward frame 225 is mounted against the front wall 208 and a rearward frame 226 is mounted against the rear wall 210. The forward frame 224 forms a space 228 which receives a forward slide plate 230. Similarly, rear frame 226 forms a space 232 with rear wall 210 and receives rear slide plate 234. A through conduit 236 extends between forward and rearward slide plates 230, 234, and a diverter conduit 238 extends between forward and rearward slide plates 230, 234. The slide plates 230, 234 are positionable within slots 228, 232 such that alternately, conduit segment 236 or conduit segment 238 are in registry with flange 220.

Forward and rearward slide plates 230, 234 include upwardly extending bosses 240, 242 which are attached to double-acting cylinder motors 244, 246 that are anchored on angle stops 248, 250 mounted on longitudinal angles 214. Accordingly, the cylinder motors 244, 246 are selectively positionable to displace the forward and rearward slide plates 230, 234, thereby positioning the conduit segments 236, 238 in registry with flange 220, and in the case of conduit segment 236, in registry with flange 222.

As shown best in FIG. 17, conduit segment 238 includes a substantially rectangular bottom opening 252 and a diverter plate 254 which acts to deflect incoming material downwardly through the bottom opening 252.

As shown best in FIG. 16, inlet and outlet flanges 220, 222 include annular gaskets 256, 258. Conduit segment 236 includes front and rear gasket elements 260, 262 which form an air-tight seal with gaskets 256, 258, respectively, when the conduit segment 236 is in registry with flanges 220, 222. Similarly, segment 238 includes gasket 264 which forms an air-tight seal with gasket 256 when these front and rear slide plates 230, 234 are displaced to place conduit segment 238 in registry with flange 220.

Figure 18:
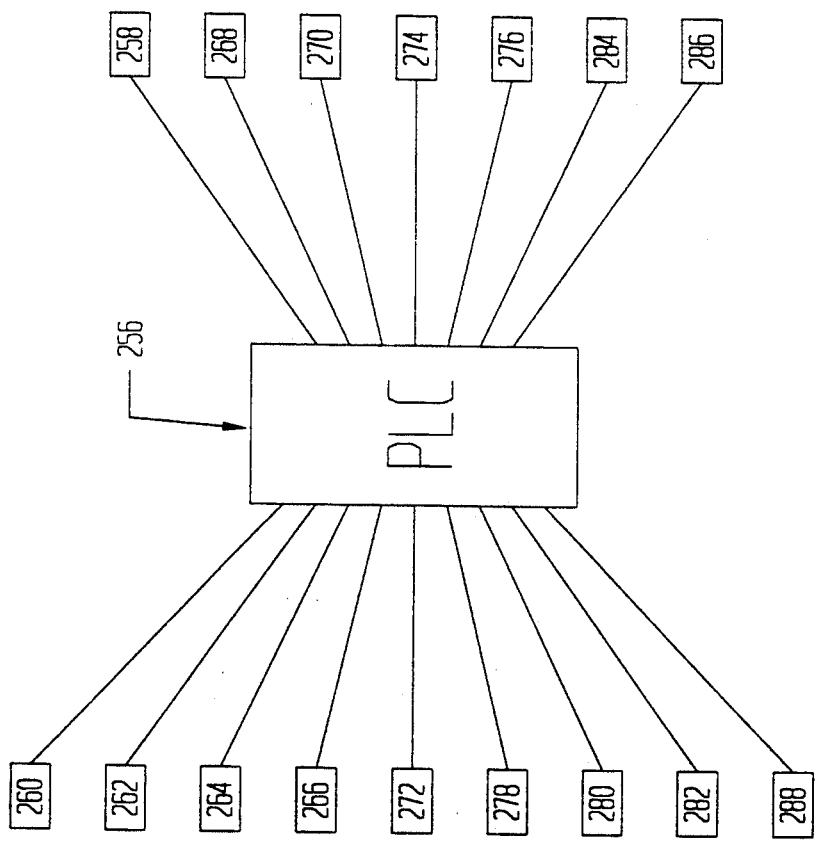
FIG. 18 is a schematic showing the controller component of the system of FIG. 1.

All of the hydraulic motors and hydraulic cylinder motors of the waste processing system shown in FIGS. 1-17 are controlled by a single programmable logic controller. As shown in FIG. 18, programmable logic controller 256 receives a signal from pressure sensor 258 when canister 96 is placed upon motorized conveyor 38. Valve 260 is actuated to activate the outer door motor 90 to raise the outer door 84 of air lock door assembly 52 of air lock 42. Valve 262 is actuated to activate the infeed conveyor 38 to displace the canister 96 through the opening in the air lock door 52 into the air lock 42. Simultaneously, the valve 264 is actuated by controller 256 to energize the conveyor 50 to receive the container 96 and displace it to the interior of the air lock 42. Valve 260 is again actuated to lower the door of the outer air lock assembly 52, and valve 266 actuated to pressurize the seals to secure the outer door assembly 52. A photoeye 268 senses the presence of the canister 96 within the air lock 42 and the controller 256 actuates the valves 266, 264 to stop the conveyors 38, 50. Proximity switches 270 located on outer door assembly 52 determine the displacement range for the door 84 within the outer air lock door 52. Alternately, a resolver may be used to determine the position of the door.

At this time, valve 272 is actuated to depressurize the seals of the inner air lock door 54. Proximity switch 274 indicates that the elevator platform 108 is in the down position so that the platform is level with the conveyor 50. A photo-eye 276 within the elevator shaft senses that the elevator platform 108 is empty, and valves 264 and 278 are actuated to displace the canister 96 from the air lock 42 onto the elevator platform 108. Valve 280 is actuated to lower the inner air lock door 54 and valve 272 actuated to pressurize the seals on that door. Valve 282 is actuated to energize the motor 102 of the elevator to raise the platform 108 to the discharger 26.

Figure 19:
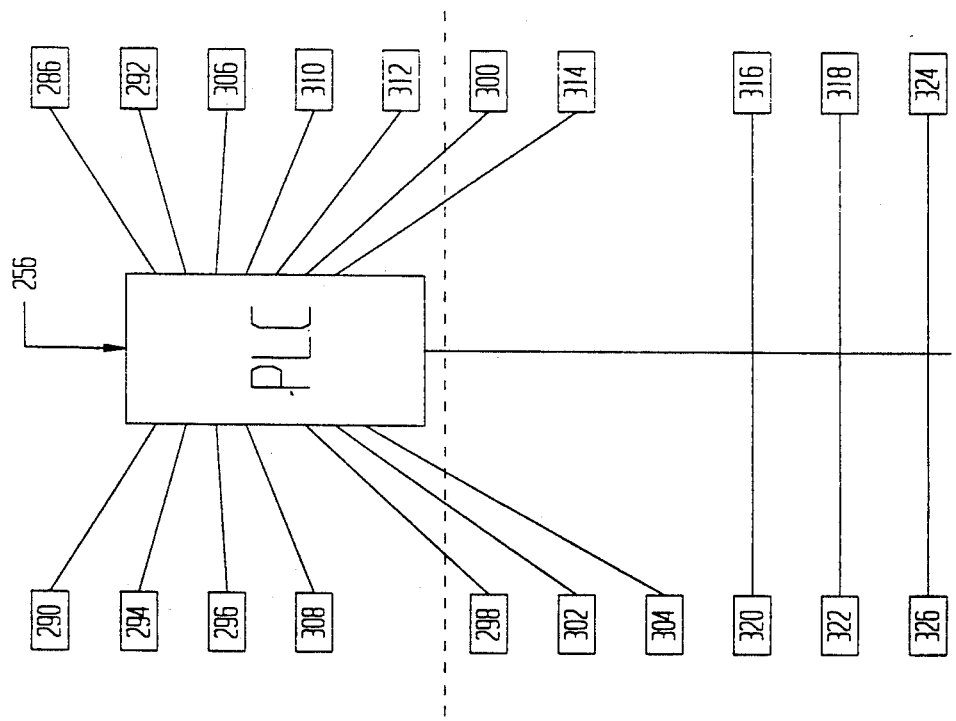
FIG. 19 is a schematic showing the controller of FIG. 17 and the connections for operating the ram carriages.

A proximity switch 284 is tripped when the elevator platform 108 reaches the discharger 26 and the controller 256 actuates motor valve 282 to stop the elevator. A photoeye 286 in the discharger detects the presence of a canister (as opposed to waste material contained in disposable containers such as drums), and the ram members 118, 120 are actuated in a sequence described with reference to FIG. 19. When the empty canister 96 is returned to the elevator platform 108 and is lowered to ground level, proximity switch 274 indicates that platform 108 is at the proper level. Valve 272 is actuated to depressurize the seals on door 54 and valve 280 actuated to raise the door. Valves 262, 264 are actuated to displace the container 96 sidewardly into the outfeed air lock 44, and door 54 is shut and sealed.

Valve 288 is actuated to purge the volume within air lock 42 with gas so that the contaminated air is driven into a charcoal canister or alternately, to the reactor 202. When the purge has been completed, valve 266 is actuated to de-pressurize seals on door 52 and valve 260 actuated to open the outer door. Valves 266 and 264 are actuated to displace the container 96 outwardly to be collected.

The arrangement of valves and sensors for air lock 44 is the same as for air lock 42. Specifically, controller 256 actuates valves which control the pressurization of seals for doors 52, 54 of air lock 44 and for the motorized conveyors 40 and 50 of air lock 44.

Valve 294 actuates the cylinders 176 on pivoting frame 154 of ram member 118 to displace the hooks 172, 170 forwardly, and valve 296 is actuated to clamp the hooks together to engage the canister 96.

Valve 298 actuates motor 146 to displace the ram member 120 sidewardly until proximity switch 300 is tripped, indicating that the ram member 120 is snug against the container 96. Valve 302 is actuated to energize cylinder motors 176 on pivoting frame 156 of ram member 120 to advance the hooks 170, 172 forwardly. Valve 304 is actuated to activate cylinder 174 to clamp the hooks 170, 172 against the container.

Valves 290 and 298 are again actuated to activate motors 134, 146 to displace the container 96 sidewardly to the drop zone 112. Proximity switch 306 is tripped when the container is properly positioned. Valve 308 is actuated to activate the rotary actuator 186 to rotate the pivoting frame 154 of ram member 118, and consequently, pivoting frame 154 of ram member 120, to dump the container 96. Proximity switch 310 is tripped when the container has been inverted 180 degrees.

The controller 256 then actuates valve 308 to rotate the container 96 back to an upright position and the valves 290, 298 actuated to displace the container 96 sidewardly to the position shown in FIG. 6. A proximity switch 312 indicates when the ram members 118, 120 are properly positioned. Valves 302, 304 are actuated to reposition the fingers 170, 172 away from engagement with container 96, and valve 298 actuated to activate motor 146 to displace ram member 120 sidewardly to the position shown in FIG. 6. A proximity switch 314 is tripped when the ram member 120 is properly positioned.

In addition to the foregoing sensors and valves, the programmable logic controller system also includes an oxygen sensor 316 and preferably includes a pressure sensor 318 to detect a predetermined gas pressure within the system of the present invention so that it may be maintained at a predetermined value. Valves 320, 322 are actuated to release an inert gas, such as nitrogen, or to depressurize the system. Further a mercury sensor 324 preferably is placed in the dual auger shredder 30, and the presence of mercury causes controller 256 to actuate valve 326 to activate cylinder motors 244, 246 of slide box 36 to position conduit segment 238 in line with flange 220 (FIG. 15) to divert mercury-contaminated waste from reactor 202. However, such sensors are well-known in the art and therefore are not illustrated here.

The system of the present invention may be adapted to suit a particular configuration of incinerator or other waste handling device. Accordingly, other geometries comprising the infeed conveyor, elevator, discharger, drop, and augers may be employed without departing from the scope of the invention.

Figure 20:
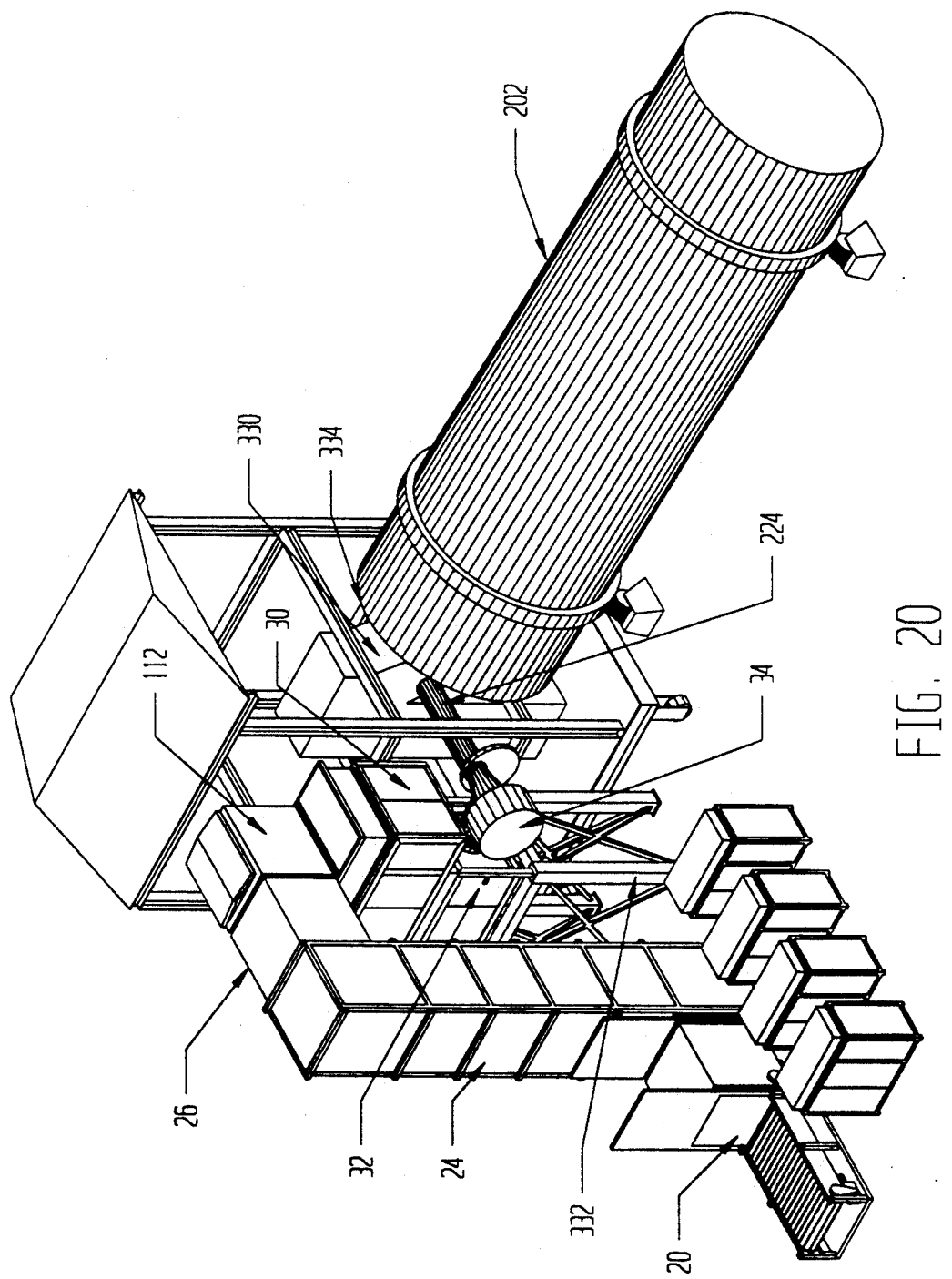
FIG. 20 is a schematic, perspective view of an alternate embodiment of the waste processing system of the present invention, utilized with a rotary kiln having an elevated infeed shoot.

For example, as shown in FIG. 20, the system of the present invention is utilized in combination with a kiln 202 having an infeed chute 330 which is at an elevation above that of the infeed conveyor 20. Consequently, the single auger 32 is elevated from the ground and supported on a frame 332 so that the injector auger 34 and feed tube 224 are elevated to feed into the infeed chute 330. Also, the entire waste processing system may be offset from the face 334 of the rotary reactor 202 in order to allow clearance for other feeding equipment and fuel input.

Figure 21:
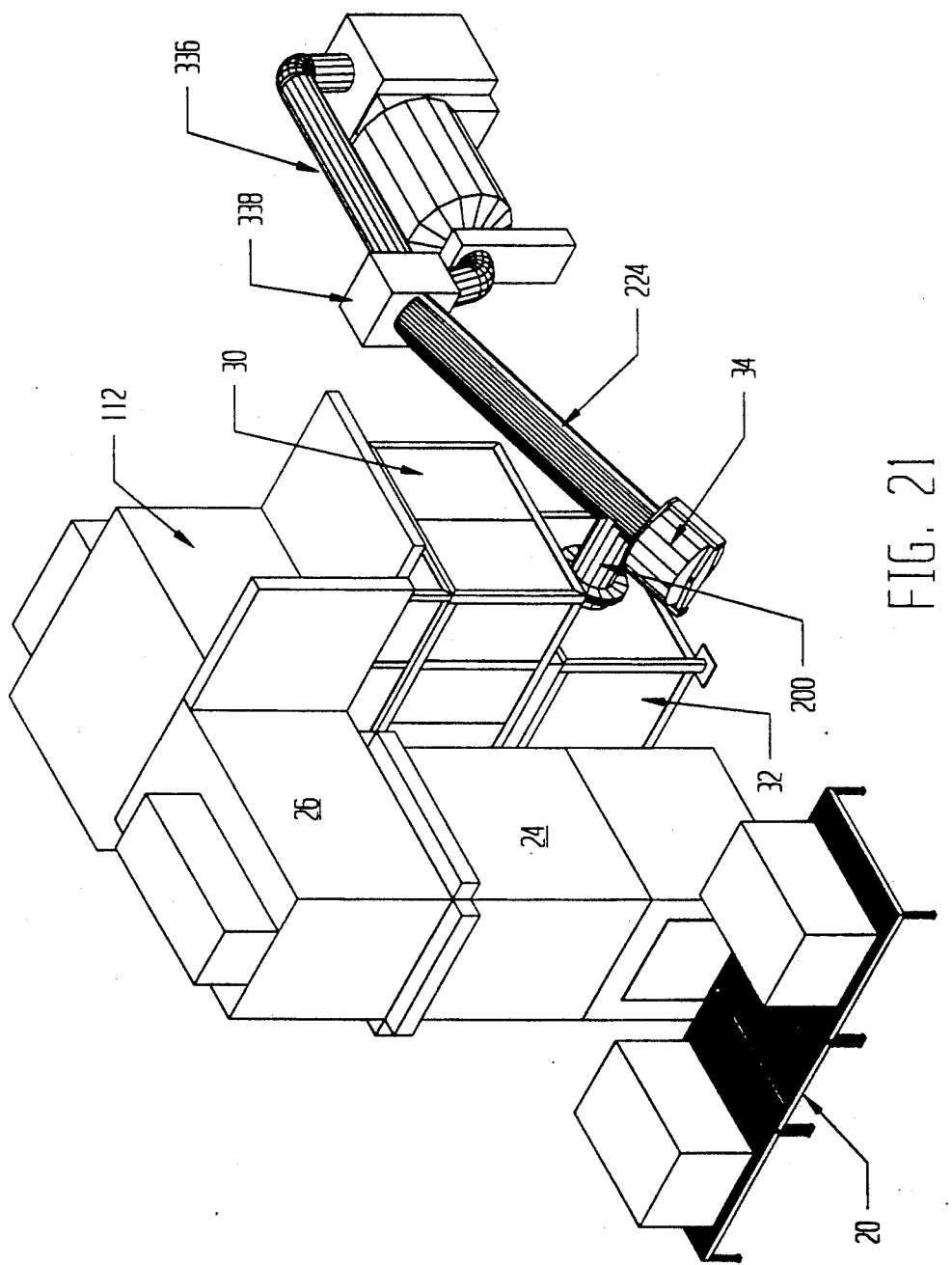
FIG. 21 is a perspective view of the waste processing system of a second alternate embodiment of the present invention feeding a sag mill having an elevated inlet.

As shown in FIG. 21, the waste processing system may be utilized in combination with a sag mill, generally designated 336. In this embodiment, the single auger 32 discharges material through the extrusion tube 200 into a modified injector auger 34'. Injector auger 34' includes a feed tube 224' which is inclined upwardly to the infeed plenum 338 of the sag mill. Consequently, although the single auger 32 is at the same level as the inlet to the elevator 24, the system may feed a device whose inlet is substantially above ground level.

Figure 22:
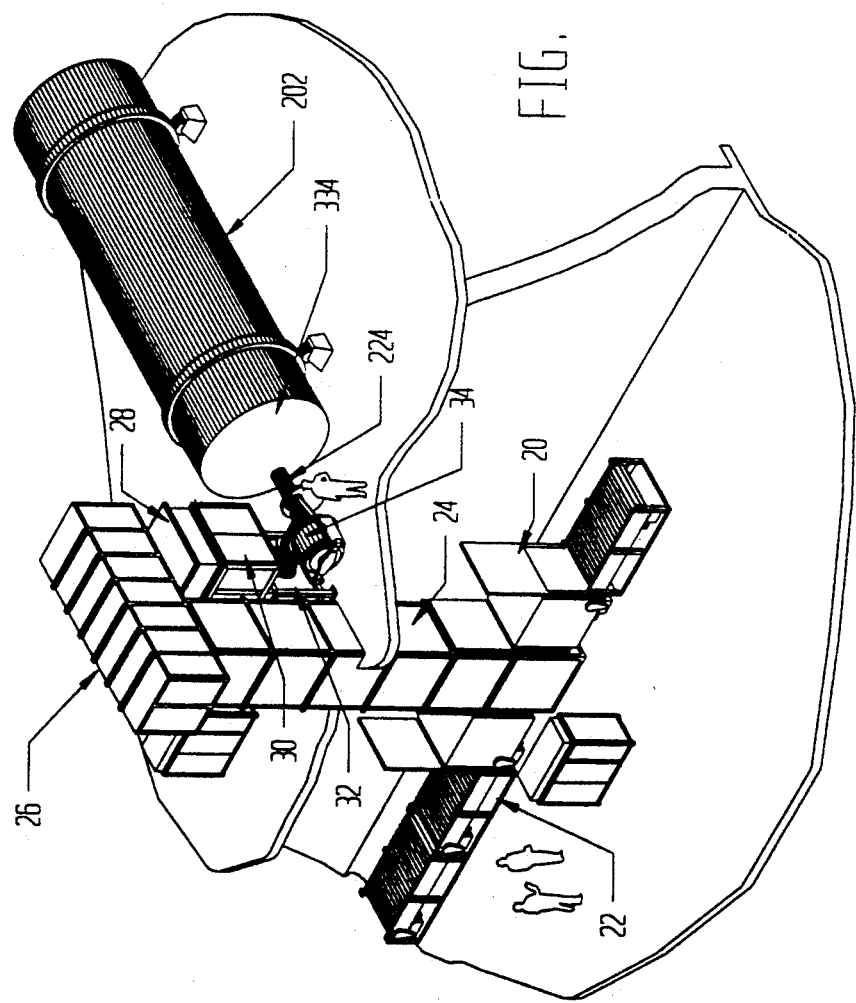
FIG. 22 is a schematic, perspective view of the waste processing system of a third alternate embodiment of the present invention in which a rotary kiln fed by the system is at a different elevation than the infeed and outfeed conveyors.

As shown in FIG. 22, the waste processing system of the present invention may be utilized with a rotary kiln 202 having a face 344 which is connected to the feed tube 224 of the injector auger 34. The injector 34 and feed tube 224 is substantially horizontal with respect to the rotary kiln 202, and is at a higher elevation than the infeed and outfeed conveyors 20, 22 respectively.

Figure 23:
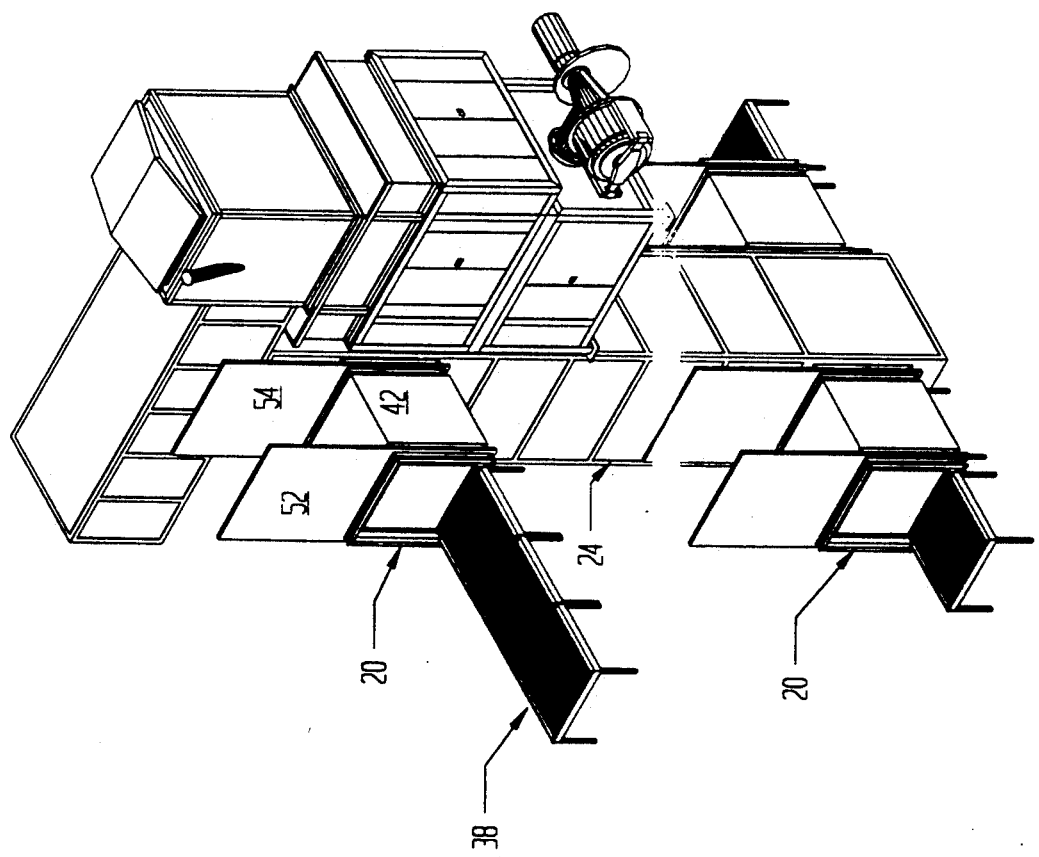
FIG. 23 is a perspective view of the waste processing system of a fourth alternate embodiment of the present invention in which a second infeed conveyor is utilized.

As shown in FIG. 23, the waste processing system of the present invention may utilize a second infeed conveyor 20', having a second infeed airlock 42' with inner and outer doors 52', 54', respectively, which is connected to elevator 24'. Second infeed conveyor 20' is located at an elevation above that of infeed conveyor 20, preferably on a floor above the floor supporting conveyor 20 (which may be at ground level or below). Second infeed conveyor 20' includes a motorized conveyor 38' for supplying containerized or palletized material to the conveyor, which conveys the material to elevator platform 108 (see FIG. 6). Consequently, the system of FIG. 23 can receive material from multiple locations at multiple elevations.

While the form of apparatus herein described constitutes a preferred embodiment of this invention, it is to be understood that the invention is not limited to this precise form of apparatus, and that changes may be made therein without departing from the scope of the invention.

What is claimed is:

1. A waste processing system comprising:
   infeed conveyor means having air lock means for receiving containerized waste;
   substantially vertical elevator means for receiving said containerized waste from said infeed conveyor means and conveying said containerized waste upwardly, said elevator means being sealed from the ambient;
   discharger means for displacing said containerized waste sidewardly from said elevator means, said discharger means being sealed from the ambient;
   means for shredding said containerized waste, said shredding means including drop chute means for conveying said containerized waste from said discharger means to said shredding means, said shredding means and said drop chute means being sealed from the ambient; and
   means for receiving shredded waste from said shredding means and injecting said shredded waste into disposal means, said receiving and injecting means being sealed from the ambient, whereby containerized waste is received, elevated, displaced sidewardly, dropped vertically, shredded and injected into disposal means in a continuous structure sealed from the ambient.

2. The system of claim 1 wherein said infeed conveyor means and said air lock means are substantially at ground level.

3. The system of claim 1 wherein said discharger means includes container dumping means for inverting a container in said discharger means over said drop chute means.

4. The system of claim 1 wherein said air lock means includes an air lock chamber having an outer door for receiving said containerized waste from the ambient, and an inner door for communicating with said elevator means.

5. The system of claim 4 wherein each of said outer door and said inner door includes a first panel having a first opening therethrough; a second panel having a second opening therethrough in registry with said first opening, thereby forming passageway; a spacer gasket separating said first and second panels and forming an interior volume; a door slidably mounted within said interior volume for opening and closing said passageway; means for displacing said door within said volume; and means for selectively forming a seal between said panels and said door.

6. The system of claim 5 wherein said seal means includes a first selectively inflatable seal member extending about a periphery of said first opening, whereby a seal is formed between said first housing plate and said door when said first seal member is pressurized.

7. The system of claim 6 wherein said seal means includes a second selectively inflatable seal member extending about a periphery of said second opening, whereby a seal is formed between said second housing plate and said door when said second seal member is pressurized.

8. The system of claim 3 wherein said discharger means includes a first ram member for displacing said containerized waste to said drop chute means.

9. The system of claim 8 wherein said first ram member includes means for gripping a container of said containerized waste.

10. The system of claim 9 wherein said gripping means includes means for inverting said container of said containerized waste to dump contents thereof into said drop chute means.

11. The system of claim 10 wherein said discharge includes a second ram member, including gripping means and inverting means, for gripping said container and inverting said container over said drop chute means in combination with said first ram member.

12. The system of claim 11 wherein said second ram member includes means for displacing said ram member within said discharger means.

13. The system of claim 1 further comprising means for receiving said shredded waste from said injecting means and selectively conveying said shredded waste into either of a plurality of disposal means.

14. The system of claim 13 wherein said selective conveying means comprises a housing having inlet flange means connected to said injecting means and outlet flange means for connection to first disposal means; first conduit segment means for interconnecting said inlet flange means and said outlet flange means; second conduit segment means for connection to said inlet flange means and having a discharge opening not connectable to said outlet flange means; and means for displacing said first and second conduit segments means within said housing such that alternately said first or said second conduit segment means is in registry with said inlet flange means.

15. The system of claim 14 wherein said second conduit means discharge opening opens downwardly for gravity discharge of contents of said second conduit means into disposal means.

16. The system of claim 14 wherein said displacing means includes a pair of slide plates, each of said slide plates being attached to ends of said first and second conduit segments and mounted on said housing for relative slidable movement.

17. The system of claim 16 wherein said displacing means includes cylinder motor means, mounted on said housing, for displacing said slide plates.

18. The system of claim 9 wherein said gripping means includes means for detecting a presence of a canister of waste in said discharger means; said detecting means including means for activating said discharger means.

19. The system of claim 1 wherein said disposal means is located at an elevation other than that of said infeed conveyor means.

20. The system of claim 19 wherein said injecting means conveys said shredded waste upwardly from said shredding means to said disposal means.

21. The system of claim 19 wherein said shredding means is at an elevation substantially the same as said disposal means; substantially horizontally to said disposal means.

22. The system of claim 19 wherein said disposal means comprises a rotary kiln having an infeed chute, and said injecting means places said shredded waste in said chute.

23. The system of claim 22 wherein said injecting means places said shredded waste in said chute at an elevation above said infeed conveyor means.

24. The system of claim 1 wherein said infeed conveyor means includes a plurality of conveyors, each at a different elevation to others of said conveyors.

25. The system of claim 20 wherein said disposal means includes a sag mill.

* * * * *